MULTISTAGE PROCESS FOR THE CONCENTRATION OF HEAVY WATER IN FEED WATER COMPRISING A MIXTURE OF WATER AND HEAVY WATER
Original Filed June 12, 1962
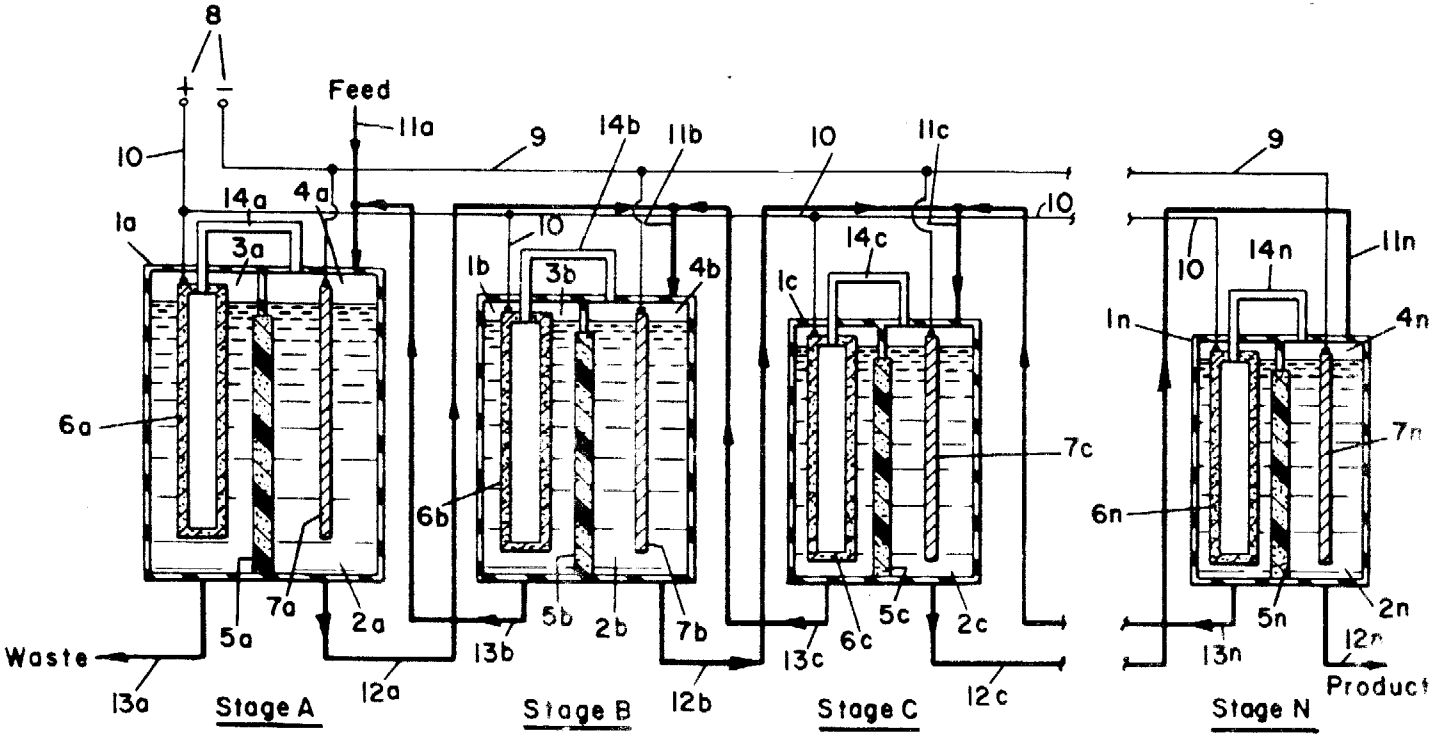
INVENTORS: GERALD P. LEWIS
PAUL RUETSCHI United States Patent Office Re. 26,913
Reissued June 23, 1970

26,913

MULTISTAGE PROCESS FOR THE CONCENTRATION OF HEAVY WATER IN FEED WATER COMPRISING A MIXTURE OF WATER AND HEAVY WATER

Gerald P. Lewis and Paul Ruetschi, by ESB Incorporated, Philadelphia, Pa., a corporation of Delaware, assignee Original No. 3,306,832, dated Feb. 28, 1967, Ser. No. 201,978, June 12, 1962. Application for reissue Aug. 3, 1967, Ser. No. 662,215
Int. Cl. B01k *1/00;* C02b *1/82*
U.S. Cl. 204—101 6 Claims

Matter enclosed in heavy brackets [ ] appears in the original patent but forms no part of this reissue specification; matter printed in italics indicates the additions made by reissue.

*ABSTRACT OF THE DISCLOSURE*

*A process for concentrating heavy water using successive stages by electrolyzing a mixture of water and heavy water to produce hydrogen and deuterium gas at the cathode and oxidizing the gas mixture at the anode. The cathode and anode are separated by a diffusion barrier which prevents instantaneous mixing of the electrolyte surrounding the electrodes. The electrolyte at the cathode becomes enriched by preferential evolution of the hydrogen and is further enriched by being fed to the cathode compartment of the next stage of concentration.*

The present invention generally relates to the production of heavy water. More specifically, the present invention is concerned with a process for increasing the concentration of heavy water in natural water by electrochemical means.

Heavy water ($D_2O$) is present in natural water ($H_2O$) in concentrations of about 1 part in 7,000. It is known that in the electrolysis of water the ratio of hydrogen ($H_2$) to deuterium ($D_2$) in the gas evolved at the cathode is higher than that in the electrolyte and as a result, the heavy water content of the electrolyte is increased. This principle has been utilized in the production of heavy water and water enriched in heavy water by carrying out electrolysis of water in a series of stages, the enriched water from the first stage, which is fed with ordinary water, being transferred to the second stage where further enrichment takes place and then to a third stage and so on until the desired degree of enrichment is attained. The deuterium content of the gas evolved in each stage is proportional to the heavy water content of the electrolyte and therefore increases with each successive stage of electrolysis. This deuterium is recovered and returned to the process by converting the hydrogen and deuterium evolved in each stage, except the first, into water which is then passed back to the electrolyte in the preceding stage. One method of converting the hydrogen and deuterium gas mixtures to water is by burning it in an atmosphere containing oxygen, cooling the water and returning it to the process. While this method of producing heavy water is used in some areas where electric power is both plentiful and inexpensive, it is not widely used because of the enormous amounts of electric power required by the process.

The amount of electric power required for the production of heavy water by electrolysis may be reduced by the utilization of a process described by Eduard Justi in his German Pat. No. 1,051,820. This process uses gas diffusion electrodes of the fuel cell type as anodes and cathodes in the electrolytic cells. Hydrogen enriched in deuterium is consumed at the anode and hydrogen depleted in deuterium is evolved at the cathode. The electrolyte is enriched in heavy water and fed to a succeeding stage where further enrichment takes place. The electrolytic cells in this process have much lower potentials than the electrolytic cells of the conventional type and therefore a considerable saving in energy cost is achieved by this technique. It has been calculated that the voltage of an electrolytic cell in the Justi process with two gas diffusion electrodes would require between 50 and 200 millivolts as compared with at least 1.8 volts for the conventional hydrogen-oxygen cell. Additional energy recovery is obtained by consuming the waste hydrogen in a hydrogen-oxygen fuel cell to produce electrical energy for the process. While in a conventional electrolytic heavy water separation plant the feed stages are the largest in size and capacity and the stages decrease in size as the product portion of the process is reached, it is inherent in the Justi process that all stages in the process be of the same size. This not only increases the capital cost, but also the operating costs of the process. In addition, since oxygen evolution is inherent in the last stage of the Justi process, the over-voltage associated therewith is also an integral part of the process.

It is an object of the present invention to provide a new and improved method for producing heavy water which is characterized by the utilization of gas consuming electrodes and the reduced energy requirements achieved thereby in which there is no net hydrogen production and no oxygen evolution, thus eliminating the expense associated with the electrolytic production of oxygen.

It is another object of the present invention to provide a new and improved process for producing heavy water by electrochemical means utilizing gas consuming electrodes in which each succeeding stage decreases in size and capacity as the product stage of the process is reached.

In accordance with the present invention there is provided a process for the concentration of heavy water by successive stages, in which each stage consists of an electrolytic cell having an anode and a cathode separated from each other by an electrolyte permeable diaphragm which defines an anode compartment and a cathode compartment and which prevents the instantaneous mixing of the electrolyte in these compartments. Both the anode and the cathode may be of the porous gas consuming type, however, the cathode may be of the conventional electrolytic type. The cathode compartment of the first stage is fed with water with a natural abundance of heavy water. This water is partially electrolyzed at the cathode and the electrolyte in the cathode compartment is consequently enriched in heavy water by the preferential evolution of hydrogen. The hydrogen and deuterium gas mixture evolved at the cathode is completely consumed at the anode of the electrolytic cell of the same stage, producing water. The electrolyte in the cathode compartment of each stage which is enriched in heavy water is fed to the cathode compartment of the succeeding stage where the heavy water concentration is further increased. Since the electrolyte from the anode compartment of each stage has a heavy water concentration which is less than that of the electrolyte in the cathode compartment of the stage, it is returned as additional feed to the cathode compartment of the preceding stage. The process is continued for as many stages as needed to produce the desired heavy water concentration desired and each stage in the process may be made smaller in size and capacity than the preceding stage. Hydrogen is completely recycled within the process and the only feed necessary after operation has begun is natural water feed. The cathode in each stage performs the enrichment while the anode serves only to provide a second electrode to complete the circuit. This results in the preferential evolution of hydrogen at a potential which is about one-tenth that necessary for the conventional electrolysis process producing hydrogen and oxygen. Since the hydrogen is recycled within each stage, the capacity of the plant is dependent only on the size of the stages.

A better understanding of the present invention may be had from the following description when read with reference to the accompanying drawing which is a schematic diagram of the heavy water enrichment process in accordance with the present invention.

Referring now to the drawing, there is schematically illustrated a plurality of similar stages designated A, B, C, through N. Each of the stages is essentially similar, but as indicated, decreases in size and capacity as the product stage of the process is reached. As will be understood by those skilled in the art, the number of stages employed will depend upon the degree of heavy water concentration desired in the product. Similar reference numerals with appropriate letter subscripts have been used to designate the components of the stages. Each of the stages comprises an electrolytic cell 1 containing an electrolyte 2 which may be either alkaline or acid. In general, alkaline electrolytes are preferred, inasmuch as suitable electrodes for use therewith are more readily available. Each of the electrolytic cells 1 is divided into an anode compartment 3 and a cathode compartment 4 by means of an electrolyte permeable diaphragm 5 which is operative to prevent the instantaneous mixing of the electrolyte in the cell compartments. Microporous membranes such as those utilized as separators in storage batteries and electrodialysis cells have been found suitable for use as the diaphragms 5. Illustrative of such materials is microporous thermoplastic resin such as polyethylene, microporous rubber, and the like.

The anode compartment 3 of each cell houses a gas diffusion electrode 6 of the porous fuel cell type. The gas diffusion anodes 6 may conveniently be made of porous sintered bodies of finely divided metals known to be catalytically active in promoting the oxidation of hydrogen. A double skeleton catalyst electrode such as described and claimed in U.S. Pat. No. 2,928,891, issued Mar. 16, 1960, to E. Justi et al., of Raney-nickel catalyst granules is illustrative of an electrode suitable for this application. Porous electrodes fabricated of silver, nickel, palladium and other metals of the platinum group have also been found to make excellent electrodes for this purpose, providing an electrolyte-gas-catalyst interface which efficiently promotes the oxidation of hydrogen to water at low polarization potentials. The cathode compartment 4 of each all house a cathode 7 which may also be of the porous fuel cell type such as described in connection with the anode 6, however, the cathode 7 may also be a cathode of the type utilized in conventional electrolytic cells for the electrolysis of water. In addition, the cathodes 7 need not be made of highly catalytically active metals since less noble metals such as iron are adequate for the purpose. It should be noted that in this respect that a higher separation factor will be obtained using electrodes of this latter type, but at a sacrifice of a higher electrode potential and therefore higher energy costs. [As shown, the electrodes 6 and 7 of the electrolytic cells 1 are connected in series and to a suitable source of direct current 8 by means of the conductors 9 and 10 such that the anode in each cell is at a more positive potential than the cathode.] *As shown, the electrodes 6 and 7 of the electrolytic cells 1 are connected in parallel or to individual power supplies; the drawing shows the cells having a parallel connection to a suitable source of direct current 8 by means of the conductors 9 and 10 such that the anode in each cell is at a more positive potential than the cathode.*

Water having a natural abundance of heavy water is fed to the cathode compartment 4a of the first stage of concentration, stage A, by means of an input feed line 11a. This feed is partially electrolyzed in the cathode compartment 4a and the electrolyte therein is consequently enriched in heavy water. The enriched electrolyte from the compartment 4a is fed to the cathode compartment 4b of the next stage concentration, stage B, by means of a feed line 12a and input feed line 11b of that stage where the heavy water concentration is further increased. The electrolyte in the anode compartment 3a has a lower heavy water concentration than the electrolyte in the cathode compartment 4a and is consequently discharged as waste by means of the feed line 13a. The electrolyte in the anode compartment 3b of the second stage, stage B, whose heavy water concentration is less than that in the cathode compartment 4b of the stage is returned as an additional feed to the cathode compartment 4a of stage A by means of a feed line 13b. The feed arrangements for each of the subsequent stages are similar and similar reference numerals with appropriate letter subscripts have been used to designate these components. The hydrogen-deuterium gas mixtures evolved at the cathodes 7 of each of the stages is fed by means of a gas feed line 14 to the gas diffusion anode 6 of the stage where it is completely consumed. The product is withdrawn from the cathode compartment 4n of the last stage by means of the product feed line 12n.

The process of the present invention is based upon the cathodic evolution of hydrogen and deuterium gas mixtures from an electrolyte and anodic oxidation of hydrogen and deuterium gases in the same stage. When the electrolyte is electrolyzed, thereby evolving gas, an enrichment of heavy water in the electrolyte is achieved. The evolved gas is poor in deuterium and this can be oxidized electrochemically to produce water. Thus, the process utilizes the separation of the hydrogen isotopes obtained by electrolysis, the separation factor, S, being defined as the ratio of hydrogen to deuterium in the gas, divided by the same ratio in the liquid. This factor is generally expressed as $$S=\frac{\left(\frac{H}{D}\right)\text{gas}}{\left(\frac{H}{D}\right)\text{electrolyte}}$$

The evolution of hydrogen using porous gas diffusion electrodes of the fuel cell type results in small irreversible voltage losses. With such electrodes a cathodic separation factor S can be as high as 7. The electrochemical oxidation of hydrogen and deuterium gas simultaneously on a similar porous gas diffusion electrode also results in small voltage losses. When all of the evolved gas is electrochemically oxidized, the anodic separation factor is 1. The net result of such a system is an electrochemical voltage for the production of hydrogen and the consumption of hydrogen which is not more then one-tenth of the voltage required for the standard technique of electrolysis with hydrogen and oxygen production, since no oxygen evolution is involved.

As illustrated, the process of the present invention can consist of N number of stages, each stage being smaller than the preceding one as the concentration of heavy water in the cathode compartment electrolyte and evolved gas is increased. The diaphragm 5 separating the anode compartment 3 and cathode compartment 4 of each stage prevents the instantaneous mixing of the electrolyte of the stage. The operation of each stage is identical, the feed to the cathode compartment of each stage being partially electrolyzed and the electrolyte in the cathode compartment of the stage being consequently enriched in heavy water. The evolved gas mixture is deuterium poor. The electrolyte from the cathode compartment 4 is then fed to the cathode compartment 4 of the succeeding stage. In the anode compartment 3 the hydrogen gas produced at the cathode compartment 4 is anodically consumed by the gas diffusion anode 6 producing water which dilutes the electrolyte in the anode compartment 3. This electrolyte has a lower heavy water content than the electrolyte in the cathode compartment 4 of the stage. In the first stage, stage A, electrolyte in the anode compartment 4a is discharged as waste, but the electrolytes in the anode compartments of subsequent stages are fed back as additional feeds to the cathode compartment of the preceding stage, resulting in a maximum deuterium recovery. This process is continued until the desired degree of heavy water concentration is achieved in the cathode compartment of the last stage.

It should be noted that higher separation of the isotope can be achieved at the anode if excess feed gas is fed to that electrode and this feed gas is only partially oxidized at the anode. Under such conditions, hydrogen is oxidized preferentially to deuterium and the effluent gas contains a higher concentration of deuterium than the feed gas. The overall separation between the anode compartment and the cathode compartment may be increased in this manner by approximately 20–40%. This can be accomplished by a rearrangement of the hydrogen flow lines in a manner analagous to the flow path of the isotopes as used in conventional gaseous diffusion isotope separation plants.

It should be understood that the process of the present invention for the concentration of heavy water differs materially from that proposed in the aforementioned patent to E. Justi et al. In this prior art process the hydrogen anodes and cathodes are located in the same compartments, the electrolyte is common to both electrodes, and hydrogen flow is from stage to stage. In this process of the present invention a diaphragm is utilized to separate the compartments to allow a heavy water gradient between the compartments and hydrogen flow is within each stage. This provides for a total recycle of hydrogen gas within each stage not heretofore contemplated. Thus, there is eliminated the need for electrolysis of water evolving both hydrogen and oxygen to provide hydrogen reflux and the cost inherent therein. In addition, it permits the decreasing of the size and capacity of the stages as the product stage of the process is reached, thereby reducing the capital investment requirements of the process.

Having described the present invention, that which is claimed as new is:

1. A process for the concentration of heavy water by successive stages, the process of each stage comprising the evolution of a hydrogen and deuterium gas mixture by electrolysis at the cathode of an electrolytic cell from an electrolyte containing mixtures of water and heavy water and consuming said gas mixture by electrochemical oxidization at the anode of said cell, said cathode being separated from said anode by a diffusion barrier which prevents the instantaneous mixing of the electrolyte surrounding said electrodes, an enrichment of the electrolyte taking place at said cathode by a preferential evolution of hydrogen, said enriched electrolyte being fed to the cathode compartment of the next stage of concentration for further enrichment.

2. A process for the concentration of heavy water by successive stages the process in each stage comprising the evolution of a hydrogen and deuterium gas mixture at the cathode of an electrolytic cell from an electrolyte containing mixtures of water and heavy water and consuming said gas mixture by electrochemical oxidation at the anode of said cell, said anode and said cathode being separated from each other by an electrolyte permeable barrier which prevents the instantaneous mixing of the electrolyte surrounding said electrodes and which defines an anode compartment and a cathode compartment in said cell, the electrolyte in the cathode compartment being enriched by the preferential evolution of hydrogen and feed to the cathode compartment of the next succeeding stage for further concentration.

3. The process of claim 2 wherein the cathode compartment of each stage is additionally fed by electrolyte from the anode compartment of the succeeding stage of concentration.

4. A process for producing multistage concentration of heavy water in feed water containing a mixture of water and heavy water which consists in supplying the feed water to the cathode compartment of an electrolyte containing electrolytic cell comprising the first stage of the process, electrolyzing said feed water at a cathode in said cathode compartment to evolve a mixture of hydrogen and deuterium gas, the electrolyte in said compartment being enriched by the preferential evolution of hydrogen, feeding said hydrogen and deuterium gas mixture to a gas diffusion anode in an anode compartment of said cell and oxidizing said gas mixture at said anode to produce water, said anode compartment and said cathode compartment being separated by an electrolyte permeable diffusion barrier which prevents the instantaneous mixing of the electrolytes in said mixture, feeding the electrolyte from the cathode compartment to the cathode compartment of the next stage, repeating the electrolyzing to further enrich said electrolyte in a series of similar electrolytic cells in which the hydrogen and deuterium gas mixture evolved in the electrolyzing is consumed at the anode of said cell.

5. The process of claim 4 wherein the electrolyte from the anode of each stage except the first is fed back to the cathode compartment of the succeeding stage.

6. A process for producing multistage concentration of heavy water in feed water containing a mixture of water and heavy water which consists in supplying the feed water to the cathode compartment of an electrolytic cell having a cathode compartment and an anode compartment defined by an electrolyte permeable diaphragm preventing the instantaneous mixing of the electrolyte in said compartments, electrolyzing said feed water at a cathode in said cathode compartment to evolve a mixture of hydrogen and deuterium gas, the electrolyte in said compartment being enriched by the preferential evolution of hydrogen feeding said hydrogen and deuterium gas mixture to a gas diffusion anode in the anode compartment of said cell and oxidizing said gas mixture at said anode to produce water, repeating the process in a series of similar electrolytic cells to achieve further enrichment, the feed to the cathode compartments of said series of electrolytic cells being derived from the cathode compartment of the electrolytic cell of the preceding stage and the anode compartment of the electrolytic cell of the succeeding stage, and withdrawing the product from the cathode compartment of the electrolytic cell of the last stage.

References Cited

The following references, cited by the Examiner, are of record in the patented file of this patent or the original patent.

UNITED STATES PATENTS

| | | | |
|---|---|---|---|
| 2,928,891 | 3/1960 | Justi et al. | 204—101 |
| 3,124,520 | 3/1964 | Juda | 204—1.06 |
| 3,256,163 | 6/1966 | Winsel et al. | 204—101 |

FOREIGN PATENTS

| | | |
|---|---|---|
| 194,368 | 1/1958 | Austria. |
| 216,470 | 7/1961 | Austria. |

TA-HSUNG TUNG, Primary Examiner.

U.S. Cl. X.R.

204—151, 180